INVENTOR.
ROBERT E. CHANDOS
BY Roy M. Pitts

ATTORNEY

United States Patent Office 3,428,791
Patented Feb. 18, 1969

3,428,791
NON-INJECTION SELF-ADAPTIVE CONTROLLER
Robert E. Chandos, Anaheim, Calif., assignor to North American Rockwell Corporation, a corporation of Delaware
Filed Apr. 24, 1963, Ser. No. 275,335
U.S. Cl. 235—151.1        6 Claims
Int. Cl. G06f 15/46; G06g 7/66

This invention relates to a control device and more particularly to means for controlling an element the dynamics of which are variable.

For purposes of exposition, a concept of this invention will be described with reference to an exemplary embodiment which is of particular utility in application to a closed loop control system. However, it will be readily apparent to those skilled in the art that the principles of the invention are generally applicable to open-loop systems. Further, it may be seen that the inventive principles described herein may be readily and generally applied to the adjustment of the dynamics of a controller in accordance with the variation of characteristics of a controlled element.

In the application of closed loop control systems to problems such as vehicle control, it is often necessary to deal with a highly resonant load or vehicle. When it is desired to apply closed loop control system techniques in the control of a highly resonant load, the dynamic response of the load may couple into the control system through the feedback sensors used for closed loop control. The resonant modes of the load may be driven unstable by the interaction between the resonant load and the closed loop control systems dynamics, resulting in instability of the control system or damage to the load.

Further, the controlled vehicles of many closed loop control systems may not have resonant modes, but may yet have variable dynamic responses which result in system instability or closed loop system oscillations at various frequencies. In other words, a non-resonant load may have time-varying dynamic characteristics which vary as a function of environment to cause the closed-loop system to behave as an undamped resonant system.

A control system in which time variations in the response characteristics of a controlled element are sensed and employed to effect corresponding or compensating changes in the controller response for maintaining a desired control characteristic is called a self-adaptive system.

Various types of self-adaptive control systems have been employed in the prior art. For example, a "dither" type control system has been used in the art for adjusting the forward loop gain of the system (e.g., adjusting the gain of the controller, itself) in response to variations in the amplitude of the controlled element response corresponding to a calibrated amplitude of the "dither" or oscillatory test input signal. The frequency of the beyond or higher than the desired maximum response frequency or speed of response of the system. If the amplitude of the vehicle response (at the dither frequency) increases, this indicates that the system gain is so high that the system is being driven unstable near such frequency. If the amplitude of the vehicle response (at the dither frequency) decreases, it indicates that the system gain could be increased to improve the system speed of response without driving the system unstable. Hence, the "dither" frequency response of the system is used to control the gain of the system to a maximum value assuring a maximum desired speed of response consistent with vehicle stability.

A disadvantage of dither-type self-adaptive control systems is the limited type of adverse dynamic situation that can be overcome in practice by reducing the system gain without sacrificing speed of response and other desirable characteristics of the system itself, under such conditions. Further, the utility of the system is compromised in having to suffer a dither input and associated system dither response. A third disadvantage is the constant wear suffered by the control system equipment in response to such continuous "dither" or high frequency signal.

Hence, it is an object of the subject invention to provide self-adaptive control means not requiring disturbance of the controlled element and which can compensate for adverse dynamic conditions without overmuch sacrificing the speed of response of the system.

Another self-adaptive means of ontrolling a controlled element described in U.S. patent application 122,125 filed July 6, 1961 by R. K. Smyth and D. G. Byles, assignors to North American Aviation, Inc., assignee of the subject invention. Such device is an adaptive notch filter, including automatic frequency tracking means, employed in the feed-back loop of a closed loop vehicle controller to decouple a sensed vehicle bending mode (having a time-varying frequency) from the vehicle feedback control mode. A disadvantage of such device is that precise frequency tracking is required in order to effectively filter such structural modes whereby careful adjustments are required in the maintenance of the equipment. Further, the device does not suppress or prevent the excitation of such bending mode, but merely prevents its dynamic interaction with the control mode, whereby the control mode is prevented from going unstable. In such a system, the vehicle structural mode may yet become unstable and endanger the flight safety of the vehicle.

Hence it is also an object of the subject invention to compensate for and suppress undesired oscillatory response modes of a controlled element. In this way the gain of the system may be increased for improved speed-of-response of the control mode without undue excitation of structural bending modes or other oscillatory response modes.

In a preferred embodiment of a concept of this invention there is provided a control system for controlling a controlled element. Included is a controller having an adjustable dynamic response characteristic. There is also provided response measuring means for measuring the spectral characteristic of the response of the controlled element. There is further provided means responsively connected to the first mentioned means for adjusting the dynamic response of the controller as a predetermined function of the spectral characteristic of the controlled element response.

By means of the above described arrangement, peak responses in the spectral response characteristic indicative of undesired oscillatory response modes, are suppressed or avoided, whereby an improved system performance is obtained.

Accordingly, it is an object of the invention to provide a control system having improved dynamic response characteristics.

It is another object of the subject invention to provide means for adjusting the dynamics of a controller so as to compensate for undesired response modes of an associated controlled element.

It is a further object of the invention to provide self-adaptive means in a controller for compensating undesired response modes of a time-varying nature.

It is still another object of the invention to provide self-adaptive means in a controller for compensating undesired response modes employing minimum data describing and measuring such modes.

These and other objects of the subject invention will become apparent from the following description, taken together with the accompanying drawings in which.

Figure 4:
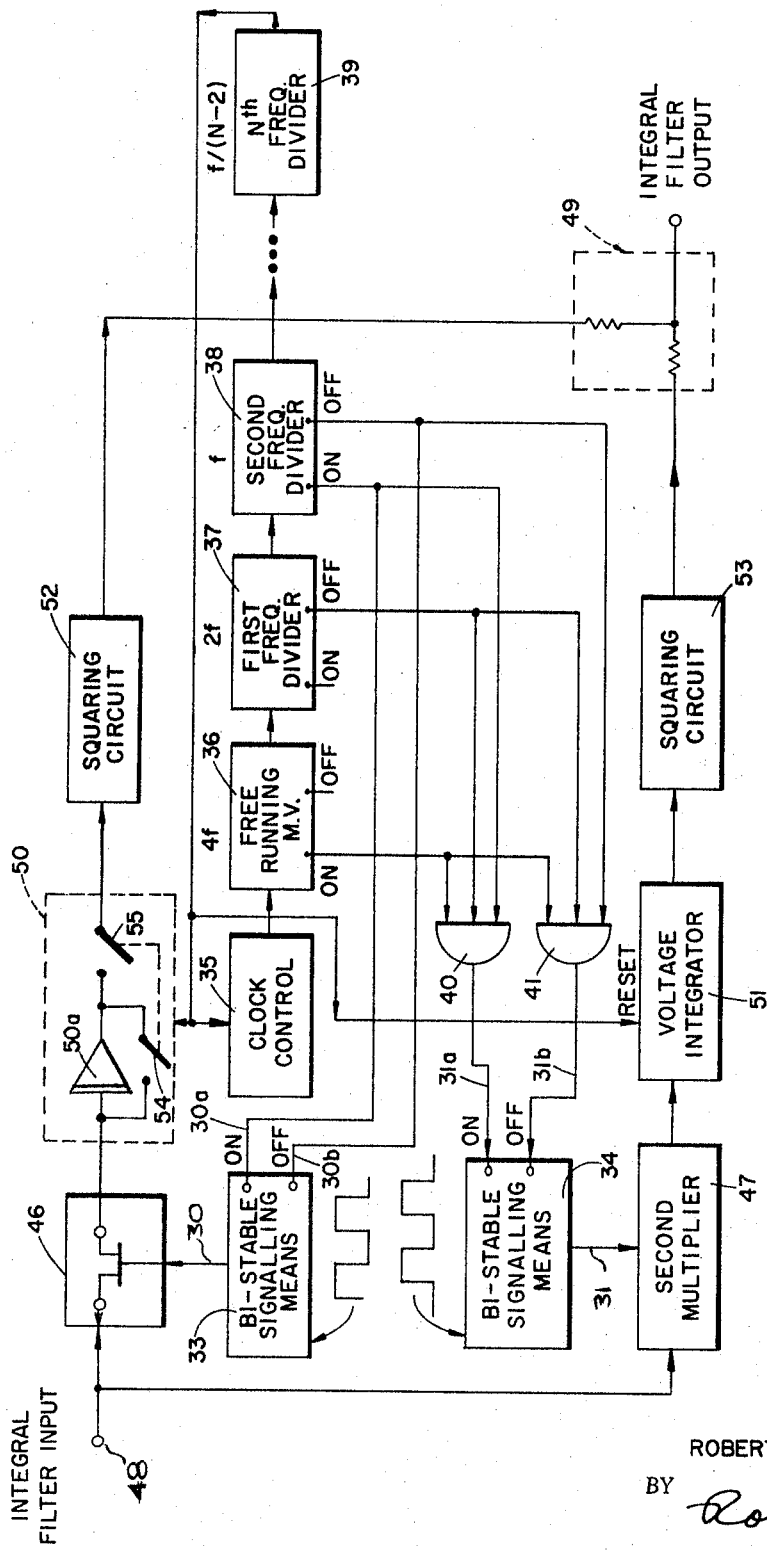
FIG. 4 is a schematic diagram of an exemplary integral filter.
Figure 5:
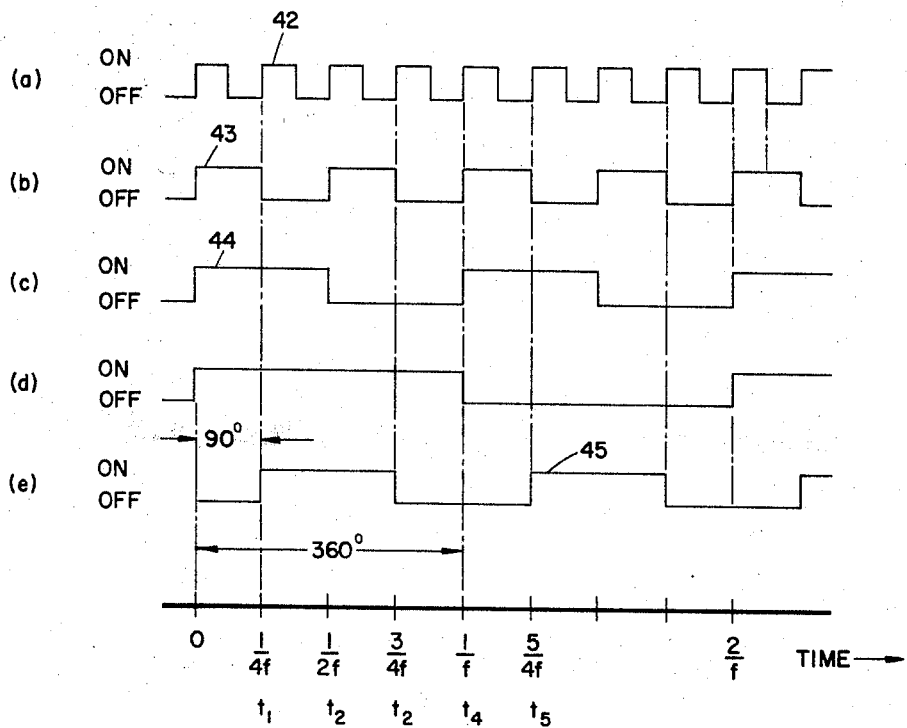
Figure 6:
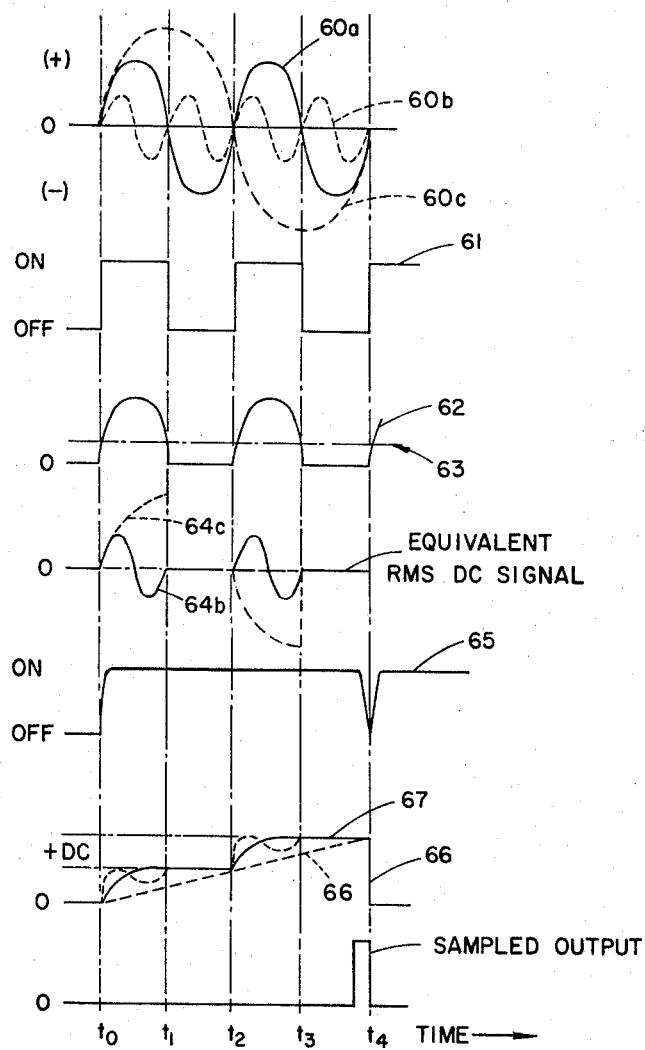
Figure 7:
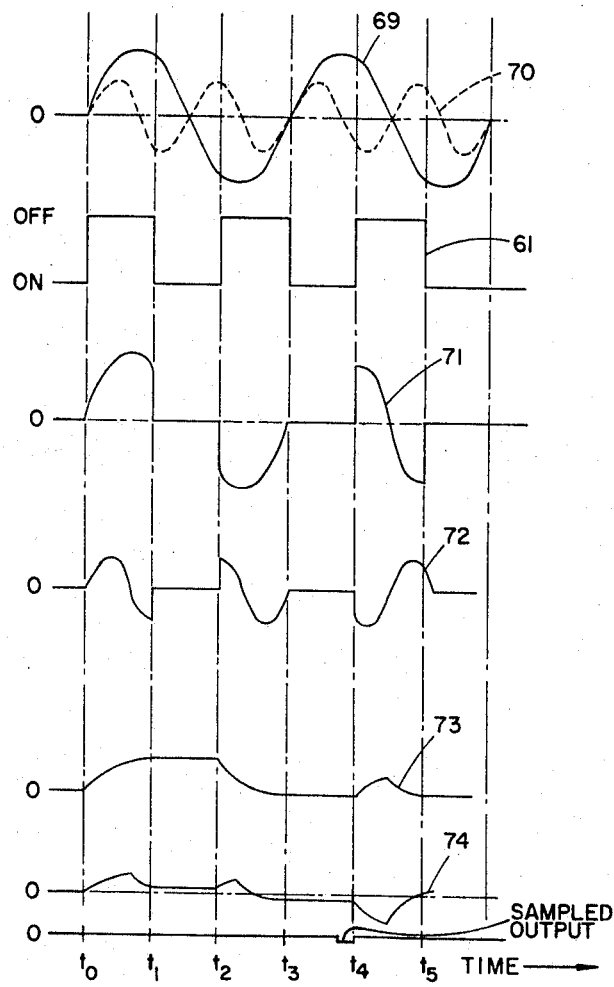

FIGS. 5, 6, and 7 are time histories illustrating the cooperation of the elements of the integral filter of FIG. 4.

Figure 8:
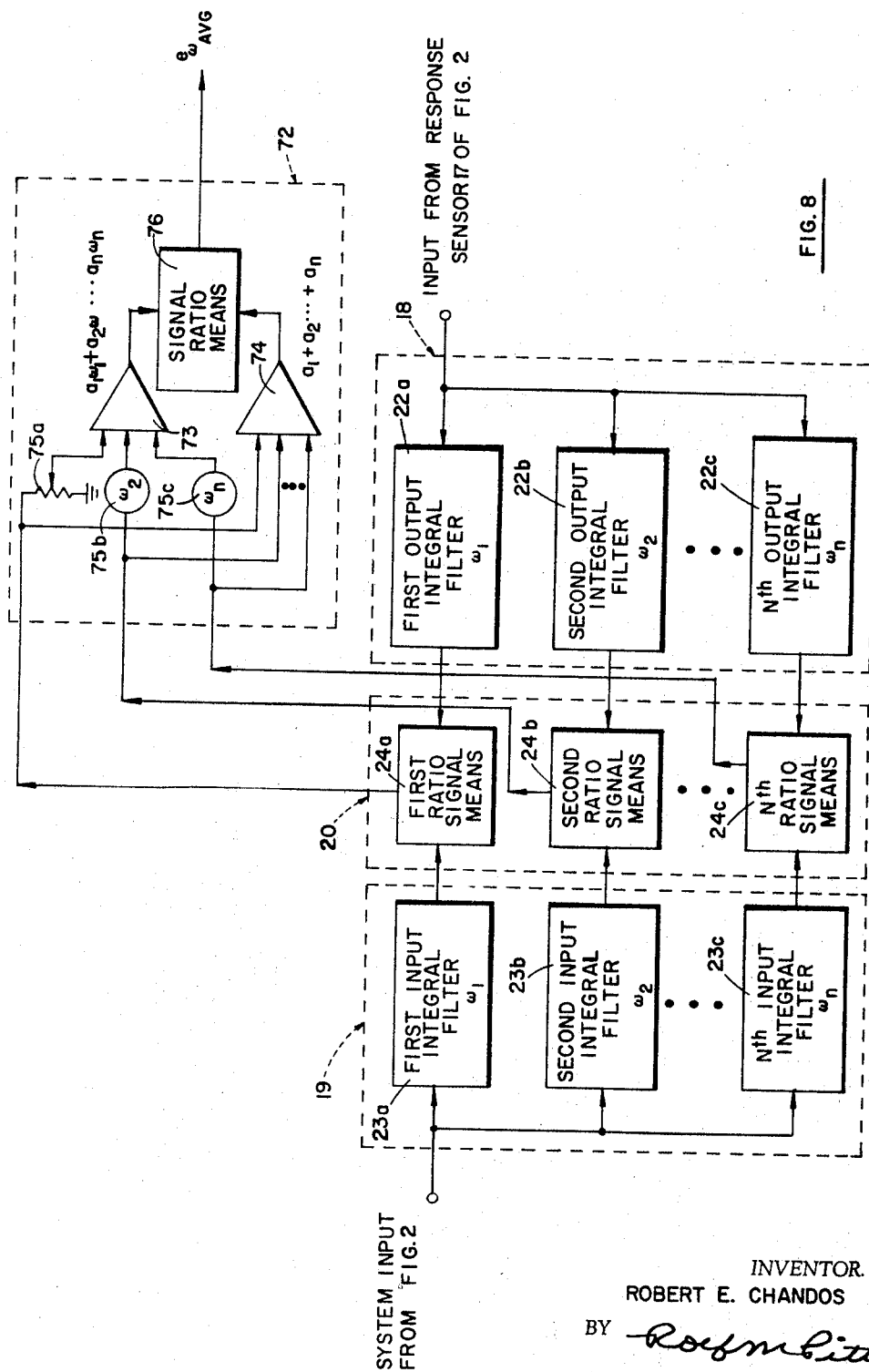

FIG. 8 is a schematic diagram of a spectral density analyzer.

Figure 9:
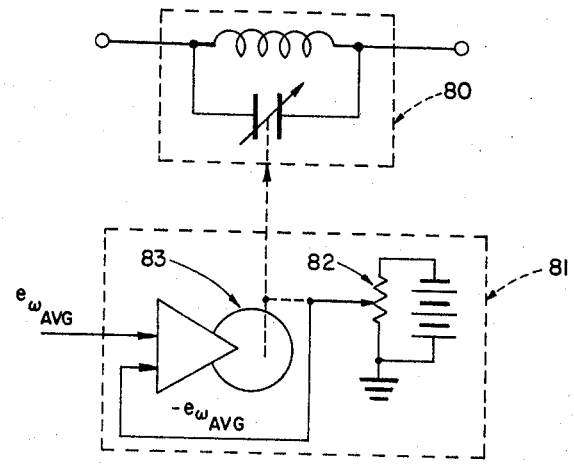

FIG. 9 is a schematic diagram of an exemplary servo-driven notch filter.

Figure 10:
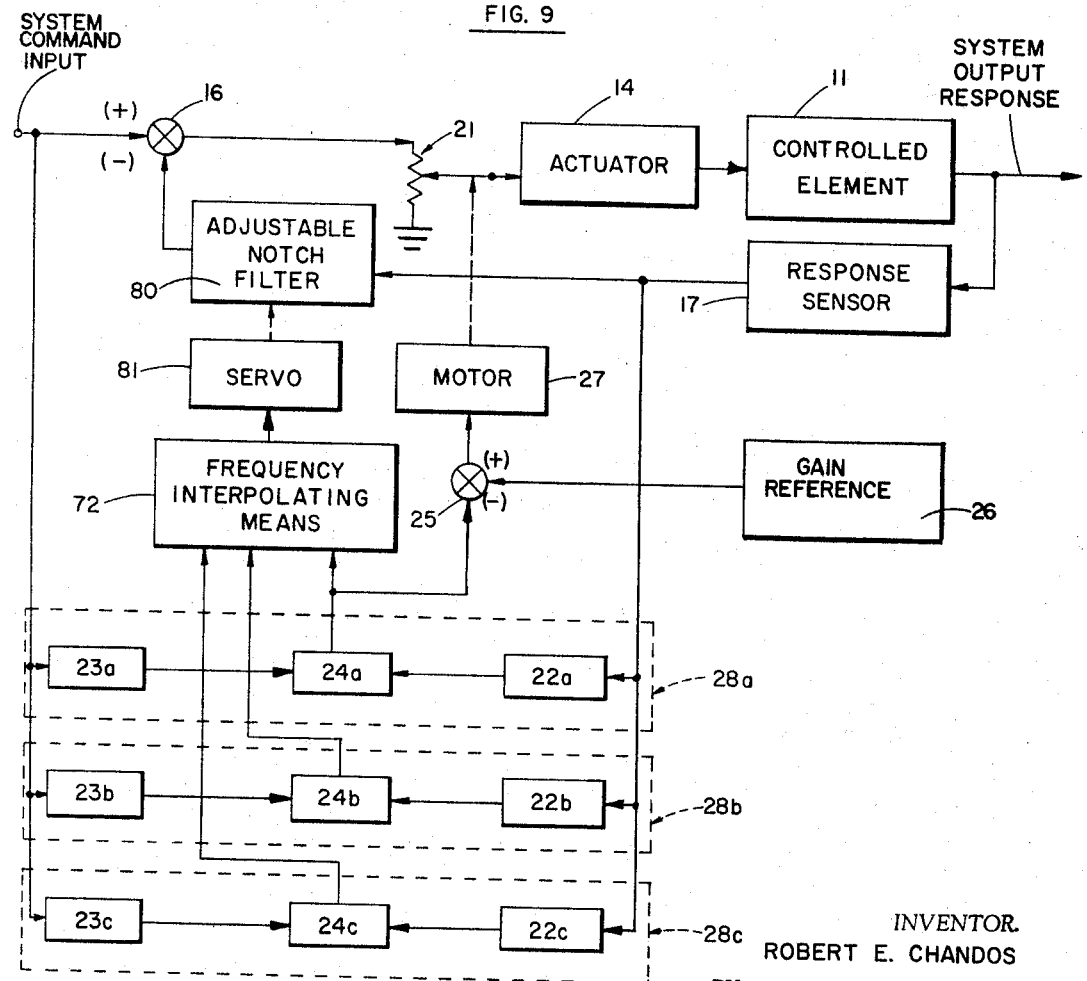

FIG. 10 is a functional block diagram embodying several aspects of the invention.

In the figures, like reference characters refer to like parts.

Figure 1:
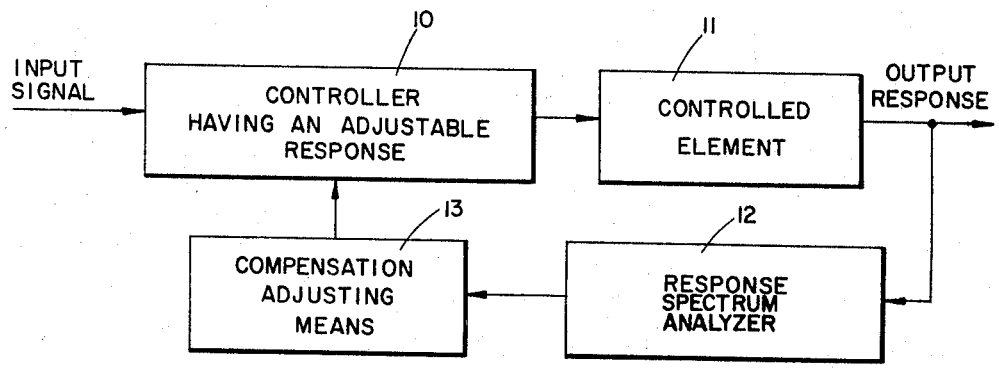
FIG. 1 is a functional block diagram of a control system embodying a concept of the invention.

Referring to FIG. 1, there is illustrated a functional block diagram of a system embodying a concept of the invention. There is provided a control system comprising a controller 10 responsive to an input signal and having an adjustable response, and an element 11 controlled by controller 10. Elements 10 and 11 may be comprised, for example, of a flight controller and aircraft respectively, or the like, and are therefore shown in block form only. As illustrated, the controlled element and controller cooperate in open-loop fashion. That is to say, the output response is not compared with the input signal to develop an error signal for correcting the output response. However, the concept of the invention is not limited to open-loop systems, and may also be applied where there is closed loop cooperation between the controller and controlled element. There is also provided response spectrum measuring means 12 for measuring the output response of controlled element 11 at selected frequencies. There is further provided compensation adjusting means 13 responsively connected to measuring means 12 for adjusting the response of controller 10 in a predetermined manner. The construction and arrangement of elements 11, 12 and 13 will be more fully described hereinafter, and are shown in block form in FIG. 1 for convenience only.

In normal operation of the above described system, compensating means 13 adjusts the response of controller 10 to compensate for the response of controlled element 11 whereby a desired form of output spectrum is maintained at the output of controlled element 11. For example, the existence of an undamped oscillatory mode in the output response of element 11 (identified as a relatively high level response measurement for a given one of the selected frequencies for which measurements are made by measuring means 12) would cause compensation adjusting means 13 to adjust the response of controller 10 to an input signal in such a manner as to provide a compensated input to controlled element 11, whereby such undesired response mode in the output of element 11 is suppressed.

Such adjustable response of controller 10 which is adjusted by compensating means 13 may be an adjustable gain, obtained by the adjustment of a potentiometer across the input or output of a signal amplifier. Alternatively, such adjustable response of controller 10 may be an adjustable dynamic response (e.g., adjustable frequency response) represented by the adjustable capacitors or inductors of a frequency-sensitive signal-shaping network or circuit, or like means well-known in the art.

Where the input to controller 10 is of a random nature, having a somewhat flat spectral content over a given frequency region of interest (known in the art as a box car signal), the output spectrum or relative frequency distribution of the output response will resemble the frequency response of the system (the ratio of the system output to the input, expressed as a function of frequency), as is well known in the servo art. Hence, any highly resonant characteristic of the output (indicated by a peak response at or near a given frequency in the output of measuring means 12) will indicate an under-damped oscillatory mode of the control system in general or of controlled element 11 in particular, which will be compensated for in the manner above described.

If, however, the input to the system of FIG. 1 has a characteristic spectral peak (i.e., if the input includes a periodic signal of a particular periodicity or frequency whose amplitude is substantially greater than the other periodic input signals) then the response of even the best of equipment would be expected to demonstrate a similar peak at a like frequency in its spectral response characteristic. Accordingly, the response of the system compensating means of FIG. 1 would serve to filter out or attenuate such input signal. In other words, the control system of FIG. 1 might be induced to respond in the manner of a notch filter to an input signal having a characteristic frequency, whereby little or no output response would occur in the output of controlled element 11. However, in usual or conventional applications, control systems are not subjected to such types of input signals.

Where the command input to the control system may, from time to time, have a characteristic peak in its spectrum (i.e., representing a periodic input having a characteristic frequency of one value or another and which substantially exceeds the other frequencies in amplitude), then the output of the controlled element would be desired to respond to such command and thus be expected to have a similar spectral characteristic. In other words, response to such periodic input should preferably not be suppressed. Hence, in the application of the invention it would be desirable that the equipment be capable of distinguishing between desired periodic output responses at a given frequency (corresponding to a periodic input, or command, of a like frequency) and undesired oscillatory output modes indicating poor system damping or instability.

It is known that the output response of a system is a function of both the system input and the response characteristic of the system. If the form of the system input is periodic, such as a sinusoidal input signal of a given frequency, then the output will have a response at such frequency. Also, the amplitude of such output will be proportional to the amplitude of the sinusoidal input. Further, the amplitude and time-phase of the output response *relative to the input response* will vary as a function of the frequency of the input signal. Such *relative* variation of system output to input as a function of frequency is called frequency response characteristic or transfer function of the system, and is a characteristic of the system. In Laplace notation:

$$E(s)_{out} = E(s)G(s)_{in} \qquad (1)$$

where $E(s)_{out}$ = system output response
$E(s)_{in}$ = input to the system
$G(s)$ = response characteristic of the system Rearranging Equation 1 and letting the Laplace operator, $s$, represent frequency, $j\omega$:

$$G(\omega) = \frac{E \text{ out}}{E \text{ in}}(\omega) \qquad (2)$$

Peaks present in such spectral response are due to the spectral characteristics of the control system response characteristic, $G(\omega)$, and are not due to the spectral characteristic of the input. Hence, such *technique* distinguishes between oscillatory responses due to an oscillatory mode in the system transfer function (e.g., response characteristic) and oscillatory responses indicative of a periodic input. Means for employing such technique to effect such distinction are shown in FIG. 2.

Figure 2:
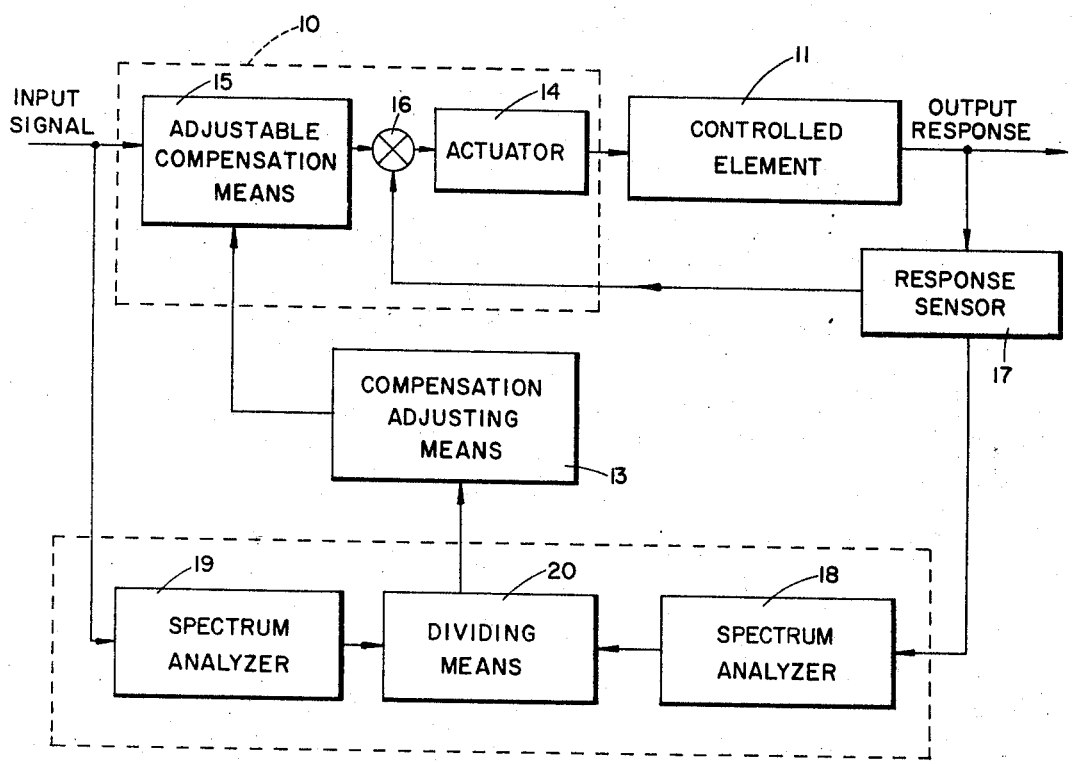
FIG. 2 is a functional block diagram of a control system embodying an additional concept of the invention.

Referring to FIG. 2, there is illustrated a block diagram of a system embodying a further concept of the invention.

There is provided a controller 10, a controlled element 11, and compensation adjusting means 13, similar to like referenced elements of FIG. 1. Controller 10 is comprised of an actuator 14 responsively connected to adjustable compensation means which, in turn, is adapted to be responsive to an input signal or command input. The adjustable feature of compensation means 15 provides an adjustable response feature to controller 10, and may be comprised of adjustable capacitors or inductors of a frequency sensitive signal shaping network or like means well-known in the art. Accordingly element 15 is shown in block form only. Elements 10 and 11 are shown, in FIG. 2, in closed-loop relation, in that the output response of controlled element 11 is sensed by a response sensor 17 and fed back to a signal comparison means 16 (such as a differential amplifier or the like) interposed between the output of compensation means 15 and actuator 14 for providing an error signal of such a sense as to cause the response of actuator 14 to tend to reduce the amplitude of the error signal, in a manner well-understood in the negative-feedback or servo art. When controller 10 is employed to control the attitude of a controlled element such as an aircraft, for example, sensor 17 may be a vertical gyro or like means well-known in the art for providing a signal indicative of the attitude response of a controlled element.

Although elements 10 and 11 are illustrated in a negative feedback cooperative relation, such relation is not necessary for the practice of the concept of the invention, the invention being equally adapted to open-loop control systems. Further, although an application of the invention is described in terms of an attitude control system for an aircraft, it is to be understood that the concept of the invention is not so limited, and it could be advantageously employed in any control system application.

There is also provided response spectrum measuring means comprising response sensor 17 and a first spectrum analyzer 18 responsively connected to the output of sensor 17. The function of spectrum analyzer 18 is to measure the average energy distribution of the output signal of sensor 17 over a range of preselected frequencies. Such spectrum analyzers are well known in the art and are described for example at pages 244–255 of "Analysis of Non-linear Control Systems" by Graham and McRuer, published by John Wiley and Sons, Inc. (1961). There is further provided, a second spectrum analyzer 19, constructed similar to analyzer 18, and responsively connected to the input to controller 10. The construction and arrangement of spectrum analyzers 18 and 19 will be described more fully hereinafter, and therefor elements 18 and 19 are shown only in block form in FIG. 2 for convenience. A signal dividing means 20 is responsively connected to each analyzers 19 and 18 to provide signals indicative of the ration of the system inputs to the outputs at particular sampled frequencies. In this way, sampled data as a function of frequency is provided, which data is indicative of the transfer function, $G(\omega)$, of the closed loop combination of the actuator 14 and controlled element 11 of FIG. 2.

Signal dividing means 20 will be described more fully hereinafter in connection with FIGS. 2 and 8, and therefore is shown only in block form in FIG. 2 for convenience. The output of dividing means 20 is operatively connected to the input to adjusting means 13.

In normal operation of the system of FIG. 2, adjustable compensation means 15 is operated in series with the closed-loop combination of elements 11, 14, 16 and 17, whereby the transfer function or frequency response characteristic $G(\omega)$ of the control system is a function of the responses of both compensation means 15 and the closed loop combination. In equation form, using Laplace notation:

$$G(s) = G_1(s) G_2(s) \quad (3)$$

where:

$G(s)$ = combined transfer function of elements 10, 11 and 17

$G_1(s)$ = transfer function of compensation means 15

$G_2(s)$ = transfer function of the closed-loop combination of elements 11 and 14

Peaks at particular frequencies for which measurements are made, as indicated by the output of dividing means 20, identify lightly damped or unstable oscillatory modes in the system transfer function, $G(\omega)$. The response of compensation adjusting means 13 to such modes is to adjust the dynamic response or transfer function $G_1(s)$ of adjustable means 15 so as to compensate for such modes in the closed-loop transfer function $G_2(s)$, whereby the overall system response or transfer function, $G(s)$ is free of such dynamic response mode.

Further, because compensation adjusting means 13 is responsive to a measure of the system output which has been normalized (divided) by the system input (i.e., is responsive to the *ratio* of the system output to the system input), the cooperation of adjusting means 13 and compensation means 15 will not cause an undesired filtering or attenuation of the system response to input signals of a characteristic cyclical or periodic nature.

Hence, it is to be appreciated that the device of FIG. 2 provides means for improving the response of a controlled element to a control signal, without disturbing the controlled element and the servo loop controlling the element. In this way, the gain of actuator 14 does not have to be unnecessarily reduced in attempting to improve the closed-loop stability, whereby the speed of response of the closed-loop performance would be sacrificed.

Figure 3:
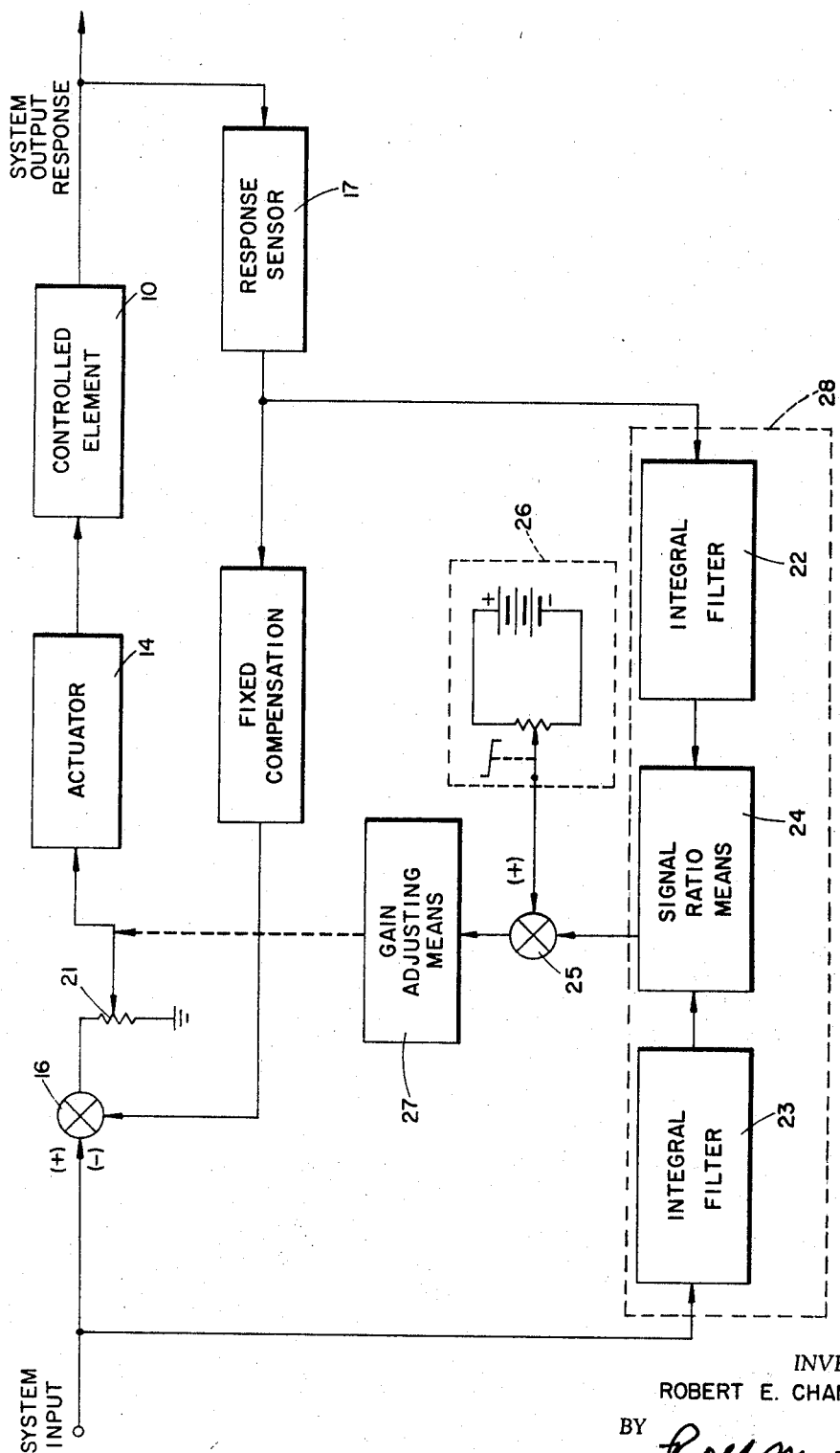
FIG. 3 is a functional block diagram of a closed loop system embodying yet another aspect of the invention.

The maximum frequency of cyclical input command for which a controlled vehicle will provide a useful response of adequate magnitude is a measure of a controlled element's speed of response or dynamic response. Such dynamic response limit of the controlled element normally defines the upper limit of the speed of response of the control system in which such element is employed. However, in a closed-loop arrangement of controller and controlled element, the maximum speed of response employed may be somewhat less due to servo control considerations of closed-loop stability.

Where it is desired to maintain a particular minimum speed of response for a given control system, corresponding to a given gain margin for a specified response frequency $\omega_0$, such response may be obtained without the use of dither or disturbance input signals by adjusting the gain of the control loop as shown in FIG. 3.

Referring to FIG. 3, there is illustrated a block diagram of a system embodying a concept of the invention. There is provided a closed-loop control system comprising an actuator 14 responsive to a system input, a controlled element 11, feedback sensor 17 responsive to the controlled element output, and signal comparison means 16, for comparing the system response sensed by sensor 17 with the system input to provide a system error signal indicative of the difference therebetween. Actuator 14 cooperates with comparison means 16 to control controlled element 10 in such a sense as to cause the magnitude of the error signal to be reduced, in a manner well understood to those skilled in the art of feedback control systems.

Interposed between the output of comparison means 16 and the input to actuator 14 is adjustable gain means 21 such as a potentiometer or other means well-known in the art for providing an adjustable signal gain. There is further provided first and second integral filter means 22 and 23 responsively connected to the system input to comparison means 15 and to the output of sensors 17, respectively. An exemplary embodiment of an integral filter is fully described hereinafter in connection with the description of FIG. 4. Accordingly, filter means 22 and 23 are illustrated for convenience in block form only in FIG. 3.

The outputs of filter means 22 and 23 are fed to signal ratio means 24 for providing a ratio signal indicative of the ratio of the system response to the system input for a given common narrow band frequency of the input and output response spectra, the middle frequency $\omega_0$ of which may be selected (for example) from considerations of a desired upper limit for the system speed of response. The construction and arrangement of analog signal divider means is well known in the art, being described for example at pages 338–340 of Electronic Analog Computers by Korn and Korn, 2nd edition, published by McGraw-Hill (1956). Accordingly, signal ratio means 20 is shown in block form only.

The amplitude of the signal for the selected frequency (a narrow frequency band) is compared at a comparator 25 with the output from an adjustable reference signal or criterion source 26. Comparator 25 is constructed and arranged similar to comparator 16. Reference signal source 26 may provide a D-C reference voltage (where the output from signal ratio means 24 is suitably rectified or detected by a diode or other unidirectional conducting means well-known in the art).

The sense of the D-C difference signal output from comparison means 25 is fed to gain adjusting means 27 such as a D-C motor operatively connected to adjustable gain means 21.

In normal operation of the device illustrated in FIG. 3, the output of second filter 23 is divided by the output of filter 22 to provide a ratio signal indicative of the gain of the system transfer function (ratio of system output to system input) at the single sample frequency, $\omega_0$. The continuous comparison of the amplitude of such ratio signal with the reference signal from source 26 indicates whether the gain is increasing, as to possibly drive the system dynamically unstable, in which case the sense of the comparison signal output from comparison means 25 causes motor 27 to adjust potentiometer 21 in such a direction as to reduce the gain of the closed loop system below such point of instability.

If, however, the comparison of the amplitude of the ratio signal with reference source 26 produces a comparison signal of opposite sense, then such comparison signal indicates that the gain is too low, whereby the speed of response of the closed loop system to a command input is too slow. In such event, the response of gain adjusting means 27 increases the gain setting of potentiometer 21, whereby the system speed of response and accuracy are improved.

Hence, the system of FIG. 3 provides means for maintaining an optimum system gain in the manner of a dither system without, however, the necessity of employing a dither signal which causes a consequent undesired dither response component in the system output or response.

In the practical design of the system of FIG. 3, it is desired to use band pass filters having an extremely narrow band pass in order to assure precise control of the system speed of response. However, conventional second or higher-order filters having high "Q's" or low damping ratios are not easily employed in such applications for several reasons. First, the sharp tuning or narrow band pass characteristics preferred for filters 22 and 23 in FIG. 3 requires extremely small-tolerance frequency-matching of such filters. In other words, such filters not only have to be matched to the desired frequency but, equally significantly, the tuning frequency of each of filters 22 and 23 must be carefully matched to the other, and not "drift" relative to the other due to temperature sensitivity, aging of components, and the like. Further, the high "Q's" or low damping ratios necessary to obtain such narrow band-pass with conventional filters require long response periods for the transient response of the filter to subside. In other words, such low damped filters "ring" or continue to demonstrate a characteristic oscillatory response to an input long after the input has subsided, whereby a filter output is provided which is not truly representative of the input (e.g., not characteristic of that frequency or point in the input spectrum represented by the tuned frequency of the filter). Reducing the "Q" to increase the filter damping only results in a corresponding adverse and undesired increase in the bandwidth of conventional filters. Accordingly, the device of FIG. 3 employs integral filters for elements 22 and 23, an exemplary embodiment for which is illustrated in FIG. 4.

Referring to FIG. 4, there is illustrated a schematic diagram of an integral filter such as filter 22 in FIG. 4. There is provided means for generating a first and second periodic signal, having a common frequency on lines 30 and 31, the second periodic signal on line 31 being in quadrature time-phase relation to the first signal. Such periodic signal means may be comprised of a digital frequency divider comprising a clock control 35, free-running multivibrator 36, and a plurality of successive bistable multivibrators 37, 38 and 39 responsively connected in tandem, the input of the first bistable multivibrator 37 being operatively connected to the output of multivibrator 36 and the output of the last bistable multivibrator 39 being fed back to clock control 35. Each of elements 35, 36, 37, 38 and 39 are constructed and arranged to cooperate in a manner well-understood in the digital art, whereby the output state of each succeeding multivibrator is changed at half the frequency of the preceding multivibrator, so as to effect a frequency division of the out put of multivibrator 36. Therefore, elements 35, 36, 37, 38 and 39 are shown in block form only. The two outputs on lines 30a and 30b of multivibrator 38, provide two-state signals having mutually exclusive states, a given state on line 30a providing an "ON" signal and a like state on line 30b providing an "OFF" signal.

The several two-state outputs of the digital frequency divider combination in FIG. 4 are combined by means of first and second AND gates 40 and 41 to provide a quadrature time phase relation of the two-state signal on line 31a (and 31b) relative to that on line 30a (and 30b). The "ON" signal output of multivibrator 36 (having a frequency four times that of multivibrator 38) and the "OFF" signal output of multivibrator 37 (having a frequency twice that of multivibrator 38) are fed to each of gates 40 and 41. In addition, the "ON" and "OFF" signal outputs of multivibrator 38 are fed to gates 40 and 41 respectively, to provide a respective output on lines 31a and 31b corresponding to mutually exclusive states of multivibrator 38, and being in quadrature time-phase relation therewith.

The normal operation of the frequency divider combination and "AND" gates 40 and 41 to provide a quadrature time phase relation may be more easily understood by reference to FIG. 5, in conjunction with FIG. 4.

Referring to FIG. 5, there are illustrated the time histories of certain elements of FIG. 4. Curves 42, 43, and 44 represent the responses or states of multivibrator 36, first frequency divider 37 and second frequency divider 38 respectively. Curve 45 represents the output of coincidence gate 40, and illustrates the time quadrature relation between such output and the output of second frequency divider 38 (curve 44).

A comparison of the response curves 42, 44 and 43 indicates that a periodic coincidence exists between the "ON" states of multivibrator 36 and 38 and the "OFF" state of first frequency divider 37 (say, at $t_1$ and $t_5$ in FIG. 5), the period being equal to the period of second frequency divider 38 (curve 44 between $t_0$ and $t_4$ in FIG. 5) and in quadrature time-phase therewith. A similar periodic coincidence occurs between the "OFF" states of frequency dividers 37 and 38 and the ON state of multivibrator 36, being of a like period as the response of frequency divider 38 and similarly in time-phase quadrature therewith. Hence, by combining the ON signal outputs from multivibrator 36 and 38 and the OFF signal output from multivibrator 37 at coincidence gate 40, a two-state output signal is provided, having a periodicity equal to that of the "ON" signal output from multivibrator 38 and being in quadrature time-phase relative therto. Similarly, the output of coincidence gate 41 is of a like periodicity and quadrature time-phase relation relative to the OFF signal output of multivibrator 38.

Referring again to FIG. 4, there is provided first and second multiplier means 46 and 47 each having an input commonly connected to a common input terminal 48 of the integral filter. A second input of each of multiplier means 46 and 47 is responsive to a mutually exclusive one of two periodic signals of like frequency, between which a quadrature time phase relation exists. Such multipliers may be comprised of field-effect transistors or other devices known in the art for modulating one input signal as a function of a second modulating signal.

There is further provided summing means 49 responsively connected to multiplier means 46 and 47 for providing an output signal indicative of the sums of the inputs thereto. Interposed between each of multipliers 46 and 47 and summing means 49 is a respective integrator 50 and 51 such as a Miller integrator-amplifier or like means well known in the art for providing an output indicative of the time integral of an input thereto. Such functional devices are described and illustrated, for example, in FIG. 5.29b on page 224 of "Electronic Analog Computers" by Korn and Korn (Second Edition), published by McGraw-Hill (1956).

The output of each of integrators 50 and 41 is squared by respective squaring means 52 and 53 before being fed to summing 49, whereby the amplitude of the signal being summed is indicative of the square of the output of an associated one of integrators 50 and 51.

By means of the above described arrangement, an input signal is modulated by two signals of like frequency and between which a quadrature time phase relation exists, whereby two modulated signal components are provided. Where the spectral content of the input signal at input terminal 48 contains a component of like frequency as the modulating frequency, each of multipliers 46 and 47 will provide a D-C output response thereto, attenuated by the sine and cosine respectively of a phase shift angle, $\theta$, existing between such spectral component and the modulating frequency source, which attenuated D-C components will be integrated by integrator 50 and 51. Hence, the cooperation between elements 46 and 50, and between elements 47 and 51, in response to an input spectral component of like frequency as the modulation frequency, is analogous to that of a watt-hour meter:

$$E_1 = E_1 \cos(\omega_0 t + \theta) E_m \cos \omega_0 t = \tfrac{1}{2} E_1 E_m \cos \theta \quad (2)$$

$$E_2 = E_1 \cos(\omega_0 t + \theta) E_m \sin \omega_0 t = \tfrac{1}{2} E_1 E_m \sin \theta \quad (3)$$

where:

$E_1$ = output from multiplier 46
$E_2$ = output from multiplier 47
$E_1(\cos \omega_0 t + \theta)$ = input signal spectral component
$E_m \cos \omega_0 t$ = first modulating signal
$E_m \sin \omega_0 t$ = second modulating signal
$\omega_0$ = modulating frequency
$\theta$ = phase shift between modulation frequency source and an input spectral component of common frequency, $\omega_0$.

Therefore, the signals from multiplier 46 and 47 respectively in response to an input of like frequency as the modulating frequency represent in-phase and quadrature components of the input-signal spectral component corresponding to the modulation frequency $\omega_0$. Hence, squaring and summing the two signals will provide an output signal indicative of the square of the amplitude of such spectral component:

$$E_1^2 + E_2^2 = \tfrac{1}{4}(E_1 E_m)^2 \cos^2 \theta + \tfrac{1}{4}(E_1 E_m)^2 \sin^2 \theta \quad (4)$$

Combining terms:

$$E_1^2 + E_2^2 = \tfrac{1}{4}(E_1 E_m)^2 (\cos^2 \theta + \sin^2 \theta) \quad (5)$$

Recalling that $(\cos^2 \theta + \sin^2 \theta)$ equals unity:

$$E_1^2 + E_2^2 = E_1^2 E_m^2 \quad (6)$$

Now, where $E_m$ is essentially constant (e.g., where the modulating signal periodically operates the multiplier in the manner of a switch), the output of summing means 48 in FIG. 4 is a function solely of the amplitude of the input spectral component corresponding to the modulating frequency $\omega_0$.

The response of the multipliers 46 and 47 to spectral components of an input at terminal 48 corresponding to frequencies other than the modulating frequency $\omega_0$, is to provide output signals indicative of the sum and difference of such signal frequencies and the modulating frequency, as is well-understood in the art. A D-C or zero frequency component of the input would produce a similar result.

Now the effect of the integrators 50 and 51 to such periodic outputs of multipliers 46 and 47 is to average them to provide averaged output data at the end of an integrator period or interval. Also, where the integrators are periodically reset by means well understood in the art (e.g., periodically short circuited at the outputs thereof), then the data output may be up-dated to reflect a minimal lag time between such input signal (as a function of time) and the corresponding time-averaged output data of the filter means. Further, such periodic resetting of the integrators reduces error signals occurring due to drift in the performance of the integrator elements. Moreover, where the integrators are both sampled and reset in synchronism with the modulating signal, then the sampled output is essentially refiltered, as to further attenuate the filter response to input signal components having frequencies other than the filter frequency of the filter modulating signal.

Such resetting of, say, integrator 50 may be effected by switching means 54 connected across the output of integrating amplifier 50a and responsively connected to the output of bistable means 39. The synchronous sampling of the output of integrator 50 to provide a sampled input to squaring means 52 may be affected by interposing a switch 55 between the output of amplifier 50a and the input to circuit means 52, and responsively connected to the output of bistable means 39. Switching means 54 and 55 are similarly constructed and arranged, as switch means 46 and 47, and may each comprise a field-effect transistor or other means well-known in the art for providing electronic switching.

The cooperation of switches 54 and 55 in FIG. 4 to effect further filtering by filter means 50 (and 51) may be more easily understood by reference to FIGS. 6 and 7.

Referring to FIG. 6, there is illustrated a family of time histories of the response of several elements of FIG. 4 to a sinusoidal input applied to input terminal 48, in phase or synchronism with the modulating or control signal supplied to multiplier 46 by signalling means 33. Curve 60a in FIG. 6 represents input signal of like frequency as the multiplier modulating signal (curve 61 in FIG. 6), both signals having a period equal to the interval between $t_0$ and $t_2$, and being shown mutually in-phase for convenience of illustration. The combined effect of the input signal and modulating signal applied to multiplier 46 in FIG. 4 is to provide a synchronously detected output, illustrated by curve 62 in FIG. 6; the time-averaged value of which is an equivalent D-C signal, illustrated by curve 63. This synchronously detected signal is fed to integrator 50 in FIG. 4.

By periodically resetting integrator 50 at integer multiples of the period of the modulating frequency (indicated by the switching pulse, curve 65 at $t_4$), integrator 50 is allowed to cyclically integrate for periods corresponding to the time interval between $t_0$ and $t_4$ in FIG. 6. Curve 66 illustrates the equivalent integrator output response to the time-averaged response curve 63. However, the integrator response to the actual input curve 62 is illustrated by curve 67, the horizontal portions of curve 67 corresponding to the "chopped" or null amplitudes of curve 62 during the intervals $t_1$ to $t_2$ and $t_3$ to $t_4$.

Where an input having a frequency which is an integer multiple or a subharmonic of the modulating frequency is applied to terminal 48 in FIG. 4 (as illustrated by curves 60b and 60c respectively in FIG. 6), the resulting modulated signals at the input to integrator 50 are illustrated by symmetrical curves 64b and 64c respectively, each having a D-C equivalent or time-average value of zero.

The effect of a second input signal component (curve 60b) having, say, a frequency double that of the modulating frequency, upon the integrator output is shown by the dotted curve 68 superimposed upon curve 67 in FIG. 6. It is to be seen from FIG. 6 that such second concurrent input has no effect upon the integrator output at time $t_1$ to $t_2$ and times $t_3$ to $t_4$. It can be similarly demonstrated that an input component (curve 60c) having a frequency representing a sub-harmonic of the modulating frequency and corresponding to the period of the periodic integrator (curve 65) would similarly demonstrate no effect on the integrator output at times $t_1$ to $t_2$ and $t_3$ to $t_4$ in FIG. 6.

It is to be appreciated that the sampled output of the integrator immediately prior to resetting the inegrator (curve 67 between $t_3$ and $t_4$ in FIG. 6) corresponds to the theoretical value of the integrated equivalent D-C existing at the reset time. In other words, the height of curve 67 between $t_3$ and $t_4$ corresponds to the height of curve 66 at $t_4$. Hence, it is clear that the sampled output of synchronously switched integrator 50 in FIG. 4 is not responsive to harmonics of the filter center frequency, a response feature peculiar to the class of filter described. Further, such sampled output is not responsive to filter frequency sub-harmonics having a period equal to or less than the periodic interval of the sample rate.

To a lesser extent, the same is true of other frequencies differing from the filter frequency or modulating frequency, as is illustrated in FIG. 7.

Referring to FIG. 7, there is provided a family of time histories similar to those of FIG. 6, for inputs having respective frequencies slightly greater and lesser than modulating frequency or filter frequency of the integral filter frequency.

Curve 61 represents the modulating signal from bistable signalling means 33 of FIG. 4, and curves 69 and 70 represent inputs applied to terminal 48 of FIG. 4 and having a respective frequency less and greater than the filter modulating frequency. The synchronously detected output of multiplier 46 in response to curves 69 and 70 is indicated by curves 71 and 72 respectively. The separate response of integrating amplifier 50a to curves 71 and 72 is illustrated by curves 73 and 74. Again, the horizontal sections of integrator response curves 73 and 74 corresponds to the "chopped" or null amplitudes of integrator input curves 71 and 72.

It is to be observed from FIG. 7 that the integrator output response to asynchronous inputs, as sampled at $t_4$ (corresponding to a periodicity of twice that of the filter modulating frequency), is a minimum for such inputs. Hence, it is to be appreciated that the response of the filter of FIG. 4 to inputs of frequencies other than the filter frequency is minimal. It can be further demonstrated that the greater the integer number of modulating cycles between which the synchronous switching and sampling of the integrator in effected, the more closely the bandwidth and side-lobe response of the filter approach zero. Hence, it is to be further appreciated that the embodiment of FIG. 4 provides improved filter means having a narrow band width and not being subject to "ringing" or internal resonant modes.

The construction and arrangement of the integral filters employed in FIG. 3 has been illustrated by the exemplary embodiment shown in FIG. 4. Frequency matching of the two filters 22 and 23 of FIG. 3 is obtained by employing a common frequency divider or modulating source (corresponding to elements 35, 36, 37, 38 and 39 in FIG. 4) for driving both filters. In this way, filter matching problems are avoided. Further, it may be appreciated that each of the spectrum analyzers of FIG. 2 may be comprised of a plurality of integral filters, each filter being adapted to filter a mutually exclusive one of a plurality of discrete frequencies, as shown in FIG. 8.

Referring to FIG. 8, there is illustrated an exemplary embodiment of transfer function computing means, including the spectrum analyzers of FIG. 2. System response spectrum analyzer 18 is comprised of a plurality of integral filters 22a, 22b and 22c, each constructed and arranged to cooperate in the manner of the filter illustrated in FIG. 4, to filter a mutually exclusive one of a plurality of discrete frequencies. Input spectrum analyzer 19 is similarly constructed and arranged as spectrum analyzer 18, with a plurality of integral filters 23a, 23b and 23c, the filters of elements 19 and 18 having like reference letters being adapted to measure a common frequency. For example, filters 22a and 23a are driven by a common filter modulating frequency, which frequency is mutually exclusive of the frequencies employed in driving filter pair 22b and 23b, and filter pair 22c and 23c.

The outputs of the filters of each filter pair is fed to a corresponding one of ratio signal elements 24a, 24b and 24c to provide a ratio signal indicative of the ratio of the system input to the system output for preselected discrete frequencies. Each of elements 24a, 24b and 24c in FIG. 8 is constructed and arranged to cooperate similarly as element 24 in FIG. 3, the plurality of elements 24a, 24b and 24c comprising ratio signal means 20. The outputs from ratio signal means 24 are fed to frequency interpolating means 72 comprising a first and second summing amplifier 73 and 74 respectively. At each input to first summing amplifier 73 is interposed gain adjusting means 75a, 75b and 75c, such as a potentiometer or the like for adjusting the gain of an input signal. The gains of such gain elements are adjusted to provide relative gains having ratios among them corresponding to the ratios of the preselected frequencies associated with the respective inputs to such gain elements. For example, the gain of gain element 75b is adjusted relative to that of element 75a to provide a gain ratio corresponding to the frequency ratio of the modulating frequency of filter pair 22b and 23b to that of filter pair 22a and 23a. In this way an output is provided at amplifier 73 corresponding to $a_1\omega_1 + a_2\omega_2 \ldots + a_n\omega_n$, where $\omega_1$, $\omega_2$ and $\omega_n$ are the frequencies for which corresponding filter pairs are employed, and $a_1$, $a_2$ and $a_n$ are the amplitudes of the ratio signals from ratio means 20 associated with frequencies $\omega_1$, $\omega_2$ and $\omega_n$, respectively.

A common input gain is employed for the inputs to second summing amplifier 74. The outputs of amplifiers 73 and 74 are fed to a signal divider 76 (constructed similarly as signal dividers 24, 24a, 24b and 24c) to provide a signal indicative of the output of amplifier 73 divided by the output of amplifier 74. In this way a signal is obtained which is indicative of the ratio:

$$\omega_{\mathrm{avg}} = \frac{a_1\omega_1 + a_2\omega_2 \ldots + a_n\omega_n}{a_1 + a_2 \ldots + a_n}$$

The signal output from signal divider 76 is indicative of the frequency corresponding to a peak amplitude signal, even though such frequency is not one of those discrete frequencies employed by spectrum analyzers 18 and 19. Hence, element 72 is referred to as a frequency interpolator. Such signal indicative of a frequency at which a peak amplitude ratio occurs in the transfer function of a controlled system or vehicle, may be employed to adjust compensating devices such as notch filters which have been provided to compensate and reduce undesired resonant response modes in the performance of the controlled system or vehicle, as shown in FIG. 9.

Referring to FIG. 9, there is illustrated exemplary servo means responsive to the resonant frequency signal (indicative of $\omega_{avg}$), generated by element 72 of FIG. 8 for adjusting the notch frequency of an adjustable notch filter to such resonant frequency. There is provided an adjustable notch filter 80, the notch frequency of which is adjusted by varying the control input applied at input 84.

Adjustable notch filter 80 may be constructed and arranged by any means known in the art. However, a parallel-tuned tank circuit having an adjustable capacitor 85 and connected in series with a signal circuit, has been shown for convenience.

There is also provided a servo element 81 operatively arranged for adjusting the notch filter so as to vary the notch frequency thereof. Servo element 81 includes a calibrated feedback potentiometer 82 in cooperation with the output of a servo motor 83 for providing a feedback signal having an amplitude corresponding to the notch frequency of notch filter 80 and having a sense opposed to that of the input signal to servo 80 from computing means 72 (of FIG. 8).

In normal operation of the exemplary arrangement of FIG. 9, servo motor 83 drives notch filter 80 in a sense determined by the difference between the servo input signal and the feedback signal, so as to reduce the amplitude of the difference toward zero, as is well understood in the art. In this way, the frequency of notch filter 80 is adjusted to correspond to that represented by the amplitude of the analog input signal to servo 83.

Hence, there has been described, in connection with FIG. 9, means for varying the notch frequency of an adjusted notch filter in response to the interpolated output from the frequency response computing means of FIG. 8. There has also been described, in connection with FIG. 3, means for adjusting the forward gain of a closed loop system as a function of the amplitude ratio or gain for a particular maximum response frequency. In order to optimize the response characteristics of such closed loop system. There has also been described, in connection with FIG. 4, integral filter means comprising the frequency response measuring means of FIG. 8.

It will be clearly understood from the above descriptions, that the spectral analyzer 12 for the system of FIG. 1 might be comprised, for example, of the plurality of output integral filters designated as element 18 in FIG. 8, the outputs of which are directly fed to the inputs of frequency interpolator 72; while the compensation adjusting means 13 and adjustable controller 10 of FIG. 1 might be comprised of servo 81 and adjustable notch filter 80 respectively of FIG. 9.

It is also to be appreciated that the concept of the invention is not limited to the suppression of a single resonant mode by means of an adjustable notch filter in cooperation with a spectrum analyzer employing integral filters. Instead, a plurality of sets of notch filters and associated spectrum analyzers may be employed, the notch filters being in series, and each set of notch filters and associated spectrum analyzer being adapted to cover that portion of the spectrum which is of interest to a particular variable resonant mode.

It is further to be appreciated that the features of optimum gain adjustment (as shown in FIG. 3) and of resonant mode suppression (as shown in FIG. 2 in conjunction with FIGS. 8 and 9) are not mutually exclusive in application, but may be combined as shown in FIG. 10.

Referring to FIG. 10, there is also illustrated a block diagram of a system combining several aspects of the invention. There is provided a closed loop control system comprising controlled element 11, actuator 14, first comparator 16, feedback response sensor 17, second comparator 25, gain ratio reference source 26 and motor 27, all constructed and arranged to cooperate substantially as like referenced elements of FIG. 3. There is further provided an adjustable notch filter 80 interposed in the feedback path from sensor 17 to first comparator 16, and constructed and arranged to cooperate with a servo 83, in the same manner as like referenced elements of FIG. 9. The input of servo 80 is responsively connected to a frequency interpolator 72, constructed and arranged as the like referenced element of FIG. 8.

There is further provided a plurality of frequency response measuring elements 28a, 28b and 28c corresponding to the frequency response measuring element 28 of FIG. 3, each element comprising an integral input filter responsively connected to the input of the system of FIG. 10, and integral output filter responsively connected to response sensor 17, and signal dividing means responsively connected to the outputs of an associated input and output filter. Each element is adapted to provide a system amplitude-ratio or gain signal, indicative of the ratio of the amplitude of the system output to that of the system input for a mutually exclusive one of a plurality of preselected frequencies. The subscript notation to the reference characters denotes such mutually exclusive frequencies. For example, the subscript notation "a" of filters 22a and 23a indicate that they are commonly adjusted to a common selected one of the mutually exclusive frequencies; while the subscript notation "a" of signal divided 24a indicates that the ratio of the system output to the input signals, or the system gain, is determined by such element for such selected frequency.

The output of each of signal dividing means 24a, 24b, and 24c is fed to the input of frequency interpolator 72, in like manner as that illustrated in FIG. 8. The output of selected signal dividing means 24a is fed to second comparator 25, in a like manner as that illustrated in FIG. 3, the frequency for which such output is generated being selected as is $\omega_0$ in the discussion of FIG. 3.

In normal operation, notch filter 83 in FIG. 10 is adjusted in accordance with the output of frequency interpolator 72, to suppress a resonant reponse mode measured by the cooperation of frequency interpolator 72 with spectral response measuring means 28a, 28b and 28c, in a manner similar to that explained in connection with FIG. 2. Further, gain adjusting means 21 is adjusted in accordance with the output of second comparator 25, to provide an optimum system gain, to provide a desired, stable speed of response, in a manner similar to that explained in connection with FIG. 3.

Hence, it is to be understood that the arrangement of FIG. 10 provides automatic adjustment of frequency-insensitive gain means 21 and frequency-sensitive filter means 80 to achieve a self-adaptive control system. Accordingly, a novel control system employing integral filters has been described for achieving an adaptive controller for control of a controlled element whose gain and dynamics are time-varying in nature.

Although a large number of such digital integral filters would appear to be required in an actual application of the concept, the use of digital circuit techniques, well-known in the art, permit the realization of small-volume high-density packaging, containing a substantial number of highly reliable integral filters. Further, although the compensation-adjusting means and the frequency-interpolator have been described in terms of analog devices, it is clear that in digital control systems (such as, for example, a digital autopilot), equivalent digital computing techniques would be employed, using circuit elements well-known in the digital art.

Therefore, it will be seen that the device of the invention provides improved and self-adaptive means for adjusting the response of a control system.

Although the invention has been described and illustrated in detail, it is clearly understood that the same is by way of illustration and example only and is not to be taken by way of limitation, the spirit and scope of this invention being limited only by the terms of the appended claims.

I claim:

1. In a control system responsive to an input signal for controlling a controlled element the combination comprising a controller having an adjustable response characteristic, means for measuring the spectral characteristic of each of the control system input signal and the response of the controlled element respectively for a preselected plurality of concomitant discrete frequencies, means responsive to said first mentioned means for indicating the spectral characteristic of the ratio of said controlled element response to said input signal, and means responsive to said second mentioned means for adjusting the response of said controller to achieve a predetermined spectral characteristic of said ratio.

2. The device of claim 6 in which each said integral filter comprises means for providing a first and second periodic signal having a common frequency, said second signal being in quadrature timep hase relation with said first signal;

first and second multiplier means each having a first input commonly connected to a common input terminal, a second input of each said first and second multiplier being responsive to said first and second periodic signal respectively for providing a respective first and second multiplied input signal;

summing means responsively connected to said multiplier means for providing an output indicative of the sums of the inputs thereto;

a voltage integrator interposed between each said multiplier and said summing means;

signal squaring means interposed between each said voltage integrator and said summing means for providing an input to said summing means which is indicative of the square of the output amplitude of said integrator; and reset signal means responsive to periodic signal means for periodically resetting said integrators, the period of periodic resetting being an integer multiple of the periodicity of said first and second periodic signals.

3. A narrow bandpass filter having an input terminal comprising means for providing a first and second periodic signal having a common frequency, said second signal being in quadrature time phase relation with said first signal, fisrt and second multiplier means each having a first input commonly conected to said input terminal, a second input of each said first and second multiplier being responsive to said first and second periodic signal respectively for providing a respective first and second multiplied input signal, summing means responsively connected to said multiplier means for providing an output indicative of the sums of the inputs thereto, a voltage integrator interposed between each said multiplier and said summing means, and signal squaring means interposed between each said voltage integrator and said summing means for providing an input to said summing means which is indicative of the square of the output amplitude of said integrator.

4. A narrow bandpass filter having an input terminal comprising means for providing a first and second periodic signal having a common frequency, said second signal being in quadrature time phase relation with said first signal, first and second multiplier means each having a first input commonly connected to said input terminal, a second input of each said first and second multiplier being responsive to said first and second periodic signal respectively for providing a respective first and second multiplier input signal, summing means responsively connected to said multiplier means for providing an output indicative of the sums of the inputs thereto, a voltage integrator interposed between each said multiplier and said summing means, and reset signal means responsive to periodic signal means for periodically resetting said integrators, the period of periodic resetting being an integer multiple of the periodicity of said first and second periodic signals.

5. In a control system for controlling a controlled element having a time-varying dynamic response, the combination comprising a controller having an adjustable gain;

a pair of first and second integral filters responsive to the input and output respectively of said system for measuring the frequency response of the system at a preselected frequency;

means responsive to said first mentioned means for adjusting the gain of said controller in a predetermined manner for improving the controller stability of said system; and signal dividing means responsive to the outputs of said filters for providing a signal indicative of the ratio of the system output to the system input, each of said filters comprising means for providing a first and second periodic signal having a common frequency, said second signal being in quadrature time phase relation with said first signal, first and second multiplier means each having a first input commonly connected to an input terminal, a second input of each said first and second multiplier being responsive to said first and second periodic signal respectively for providing a respective first and second multiplied input signal, summing means responsively connected to said multiplier means for providing an output indicative of the sums of the inputs thereto, a voltage integrator interposed between each said multiplier means and said summing means, signal squaring means interposed between each said voltage integrator and said summing means for providing an input to said summing means which is indicative of the square of the output amplitude of said integrator, and reset signal means responsive to said periodic signal means for periodically resetting said integrators, the period of periodic resetting being an integer multiple of the periodicity of said first and second periodic signals.

6. A device for measuring the spectral characteristics of a control system, comprising a plurality of pairs of first and second integral filters responsive to the input and output respectively of said system, each said pair responsive to a mutually exclusive one of a plurality of discrete preselected frequencies;

first signal dividing means responsive to each said filter pair for providing a signal indicative of the ratio of the system output to the system input at said frequency;

first and second summing means responsive to said signal dividing means;

gain means interposed at the inputs to said first summing means for adjusting the relative gains of the inputs thereto in accordance with the ratios among the preselected frequencies for which said inputs are associated; and second signal dividing means responsive to said summing means.

References Cited

UNITED STATES PATENTS

| | | | |
|---|---|---|---|
| 3,250,897 | 5/1966 | Vasu et al. | 235—151 |
| 3,250,903 | 5/1966 | Vasu et al. | 235—151 |
| 3,068,467 | 12/1962 | Grimaila | 235—189 |
| 3,177,347 | 4/1965 | Cowley | 235—151 |
| 3,241,077 | 3/1966 | Smyth et al. | 235—151 |
| 3,242,321 | 3/1966 | Chope | 235—181 |
| 2,880,384 | 3/1959 | Surtees | 318—20.050 XR |
| 2,981,500 | 4/1961 | Carlton | 318—20.050 XR |
| 3,308,360 | 3/1967 | Vanderbilt | 318—20.360 XR |
| 3,340,451 | 9/1967 | Farrand | 318—20.360 XR |

MARTIN P. HARTMAN, *Primary Examiner.*

U.S. Cl. X.R.

328—167; 318—18